United States Patent [19]
Ito

[11] Patent Number: 4,988,996
[45] Date of Patent: Jan. 29, 1991

[54] DISPLAY SYSTEM

[75] Inventor: Saburo Ito, Hamamatsu, Japan

[73] Assignee: Sanshin Kogyo Kabushiki Kaisha, Hamamatsu, Japan

[21] Appl. No.: 388,684

[22] Filed: Aug. 2, 1989

[30] Foreign Application Priority Data

Aug. 2, 1988 [JP] Japan ................................ 63-192086

[51] Int. Cl.$^5$ .......................................... G08B 23/00
[52] U.S. Cl. ................................ 340/984; 73/178 R; 367/111
[58] Field of Search ............... 340/984, 438, 945, 723, 340/712, 425.5, 439; 73/178 R; 116/26; 440/2; 43/17, 17.1, 4, 4.5, 1; 367/108, 99, 111, 112, 95, 908

[56] References Cited

U.S. PATENT DOCUMENTS

| | | | |
|---|---|---|---|
| 2,998,591 | 8/1961 | Lovett | 340/984 |
| 4,419,654 | 12/1983 | Funk | 340/438 |
| 4,785,280 | 11/1988 | Fubini et al. | 340/438 |
| 4,837,750 | 6/1989 | Saunders | 367/111 |
| 4,879,697 | 11/1989 | Lowrance et al. | 367/111 |

OTHER PUBLICATIONS

Vexilar Instruction Manual, Model 482 LCD, 1985, cl. 367-111.

Primary Examiner—Joseph A. Orsino
Assistant Examiner—Brent A. Swarthout
Attorney, Agent, or Firm—Ernest A. Beutler

[57] ABSTRACT

A display system in a marine vessel or other vehicle which includes various means or sensors for detecting various operating and navigating conditions of the vessel or vehicle and a single displaying device for displaying information regarding one or more of these conditions. When the display system is used in a marine vessel, the system also includes a fish detection sensor and information regarding the detection of fish is displayed on the single displaying device. The single displaying device has a fixed display which displays information regarding particular operating and navigating conditions and a variable display. The variable display has three displays: a first display of information, a second display of information and a warning display of warning information. The first and second displays can be displayed alternately by the operator. The warning display of warning information regarding at least one of the various operating and navigating conditions is displayed automatically when that particular condition is detected to be outside of its predetermined range.

19 Claims, 6 Drawing Sheets

DISPLAY SYSTEM

BACKGROUND OF THE INVENTION

The invention relates to a display system for a marine vessel or other vehicle. More particularly, the invention relates to a display system having a single displaying device for displaying information regarding various operating and navigating conditions of the vessel or vehicle. When the invention is used in a marine vessel, the displaying device also displays information regarding the detection of fish.

Previous displays in marine vessels, which display operating and navigating information as well as fish detection information, display such information on two or more separately installed panels or display devices. As a result, it is difficult for the operator simultaneously to view and cope with all of the information displayed on these panels or devices. Such displays also make it difficult for the operator to promptly recognize and cope with any abnormality regarding any of the operating or navigating conditions being displayed on a panel or device other than the one currently being watched.

Therefore, it is an object of this invention to centrally control information regarding various operating and navigating conditions of a vessel or vehicle as well as fish detection information in a marine vessel, and to display such information on a single displaying device.

Another object of this invention is to permit the operator to control the display of information so that all information is not displayed simultaneously.

A further object of this invention is to improve the visibility of displayed information concerning the various operating and navigating conditions.

Yet another object of this invention is to improve the safety of operating the vessel or vehicle by displaying all information on a single displaying device so that the operator can easily and promptly recognize and cope with any abnormality regarding the conditions being displayed.

The single displaying device includes a variable display having a first display, a second display and a warning display. These displays are displayed alternately. The warning display is displayed automatically when one or more of the various operating and navigating conditions are detected to be abnormal. A flashing warning signal appears on the variable display for the particular condition detected to be abnormal.

Thus, the invention enables the operator to control the amount of information viewed at one time while automatically alerting the operator to an abnormality in one or more of the various operating and navigating conditions of the vessel.

SUMMARY OF THE INVENTION

A display system in a marine vessel or other vehicle which includes various means for detecting various operating and navigating conditions of the vessel or vehicle and a single displaying device for displaying information regarding at least one of the aforementioned conditions. In a marine vessel, the display system further includes means for detecting fish and the single displaying device also displays information regarding the detection of fish.

The single displaying device includes a fixed display for displaying frequently watched information regarding particular operating and navigating conditions. Such information typically includes fuel level, engine speed, vessel speed, engine operating time and time. The single displaying device also includes a variable display which has three displays: a first display of information, a second display of information and a warning display which displays warning information. The first display typically displays information concerning oil level, engine cooling fluid temperature, battery voltage, trim angle of the drive unit and water depth. The second display typically displays information regarding fish detection, water temperature, vessel direction and vessel position. The warning display preferably displays warning information regarding fuel level, oil level, engine cooling fluid temperature, battery voltage and water depth. When one or more of these conditions are detected to be outside of a predetermined range for that particular condition, the warning display displays a flashing warning signal for that particular condition.

BRIEF DESCRIPTIONS OF THE DRAWINGS

FIG.,6 is a schematic illustration showing another embodiment of the display system including a sub-display and an example of installation.

DETAILED DESCRIPTION OF THE PREFERRED EMBODIMENTS

Figure 1:
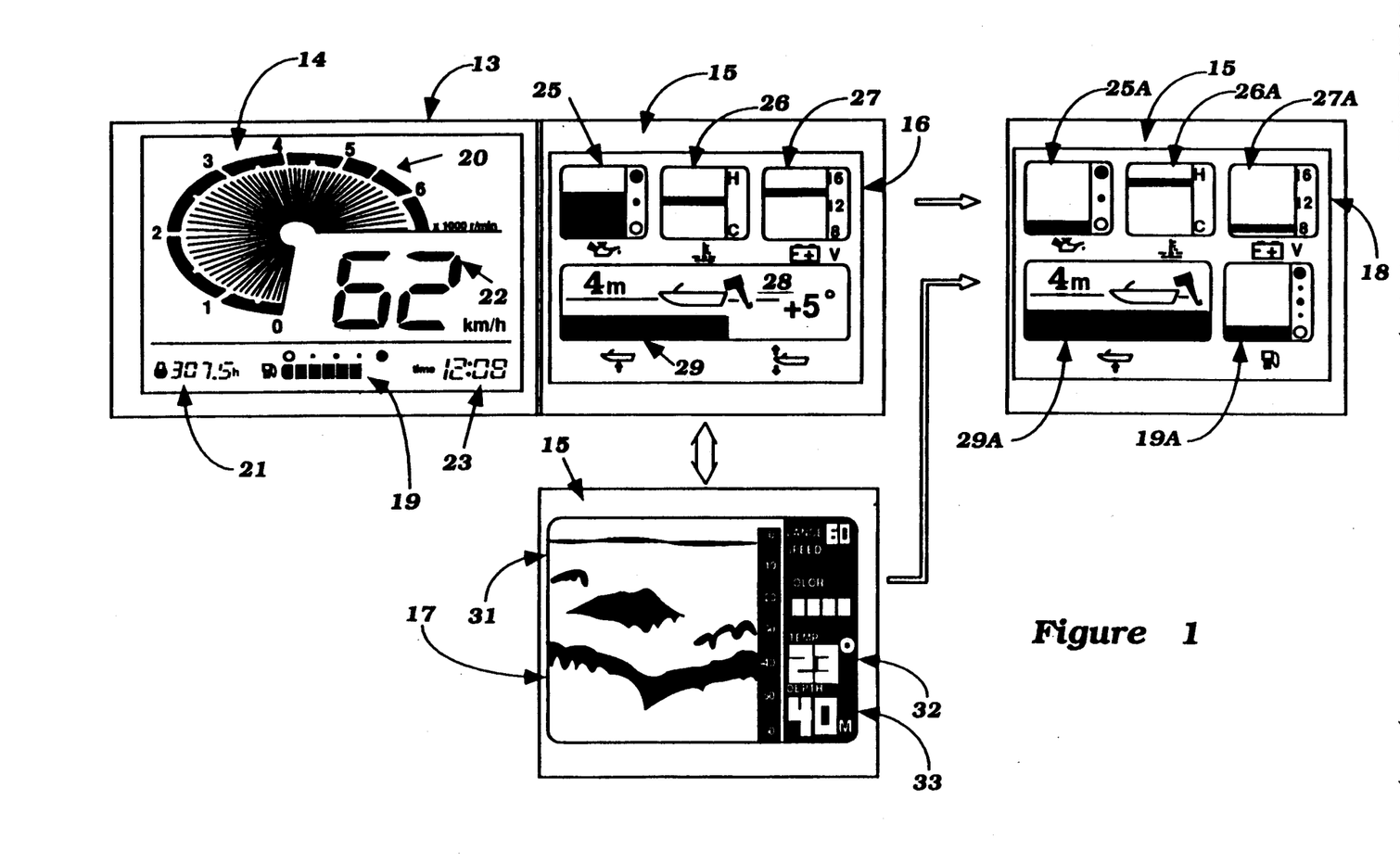
FIG. 1 is a schematic illustration showing an embodiment of the displaying device, including the fixed and variable displays, according to the present invention.

FIG. 1 shows a single displaying device 13 of a display system 12 for use in a vehicle or preferably a marine vessel 11 (FIG. 2) having an outboard drive unit 10. The outboard drive unit 10 includes an engine and propelling means for propelling the vessel through the water. This displaying device 13 comprises a fixed display 14, preferably of the liquid crystal display (LCD) type, and a variable display 15 preferably of the cathode ray tube (CRT) type. The variable display 15 has three different displays: a first display of information, indicated generally by reference numeral 16, a second display of information 17, and a warning display of warning information indicated by numeral 18.

In the preferred embodiment, the fixed display 14 constantly displays information typically watched frequently by the operator during the operation of the vessel or vehicle. This information includes fuel level 19, engine speed 20 usually indicated in revolutions per minute (rpm), engine operating time 21, vessel speed 22, and time displayed on a clock 23.

The variable display 15, on the other hand, alternately displays three groups of information: first, second and warning displays of information 16, 17 or 18. First and second displays of information 16 and 17 are usually of the type not so frequently watched. In the preferred embodiment, the first display 16 includes information regarding oil level 25, engine cooling fluid temperature 26, battery voltage 27, trim angle of the drive unit 28 and water depth 29. The second display 17 includes information regarding the detection of fish 31, water temperature 32 and water depth 33. The second display 17 may also include information concerning vessel direction and vessel position. Information regarding fish detection 31 includes the presence or absence of fish and may include relative location of the fish.

The warning display 18 includes a fuel level warning 19A, an oil level warning 25A, an engine cooling fluid temperature warning 26A, a battery voltage warning 27A and a water depth warning 29A. At least one of these warnings is automatically displayed on the warning display 18 of the variable display 15 when the condition relating to that warning is detected to be outside of a predetermined range 56 (see FIG. 3) for that particular condition. In the preferred embodiment, the warning or warnings are flashingly displayed and may be accompanied by a warning buzzer sound.

Figure 2:
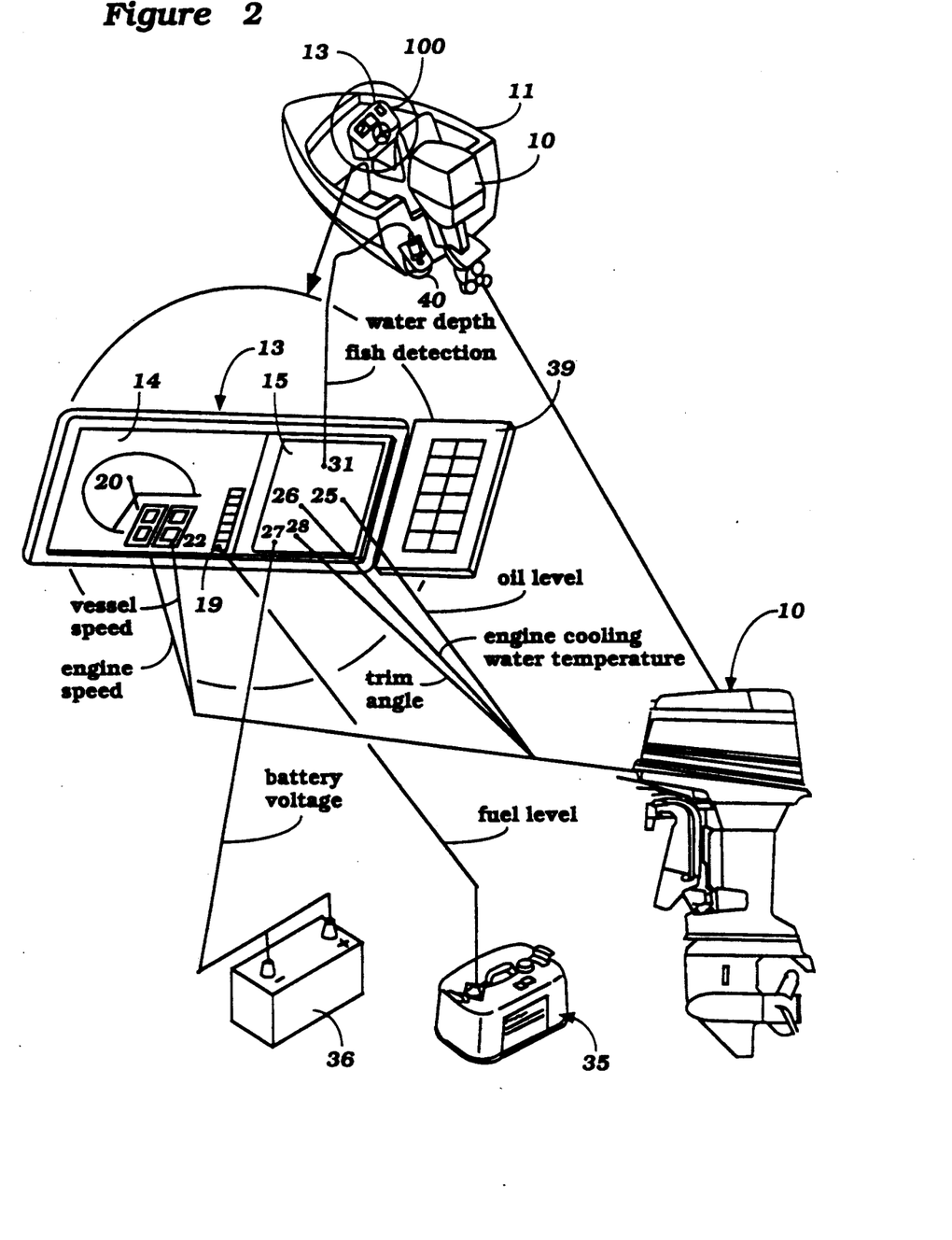
FIG. 2 is a schematic illustration of an arrangement and construction of the display system in combination with a vessel.

FIG. 2 schematically shows an arrangement of the display system 12. In FIG. 2, the display system 12 further includes a mode switch 39 for alternately displaying the first or second displays of information 16 or 17 when no warning information is being displayed. By depressing the mode switch 39, the operator can change the variable display 15 from the first display of information 16 to the second display of information 17 and vice versa. In the preferred embodiment, the displaying device 13 and mode switch 39 are positioned adjacent to one another on the dashboard of the marine vessel 11.

In this embodiment, a main display, indicated generally by reference numeral 100, is positioned in front of the driver's seat on the dashboard. This main display 100 configuration includes the display device 13, the mode switch 39 and a control device 53 (see FIG. 3).

The display system 12 further includes a fish detection sensor 40 which may also act as a water depth sensor affixed to the transom of the marine vessel 11, preferably on either side of the drive unit 10. As schematically illustrated in FIG. 2, the fish detection sensor 40 detects the presence or absence of fish below or near the marine vessel 11 and may also detect the water depth. This information is then transmitted to a control device 53 (see FIG. 3) and ultimately to the displaying device 13 where the fish detection information 31 and water depth information 33 appear on the variable display 15 as part of the second display of information 17.

The display of information regarding various operating and navigating conditions is also illustrated schematically in FIG. 2. A fuel level sensor 41 on the fuel tank 35 senses the level of fuel in the tank 35. In accordance with the invention, fuel level information appears on the fixed display 14. In a like manner, a battery voltage sensor 44 senses the voltage of the battery 36 so that this information can be displayed on the variable display 15. Sensors for the oil level 42, engine cooling fluid temperature 43, trim angle 45, engine speed 46 and vessel speed 47 are located on the outboard drive unit 10. The information regarding these conditions is displayed on the displaying device 13.

Figure 3:
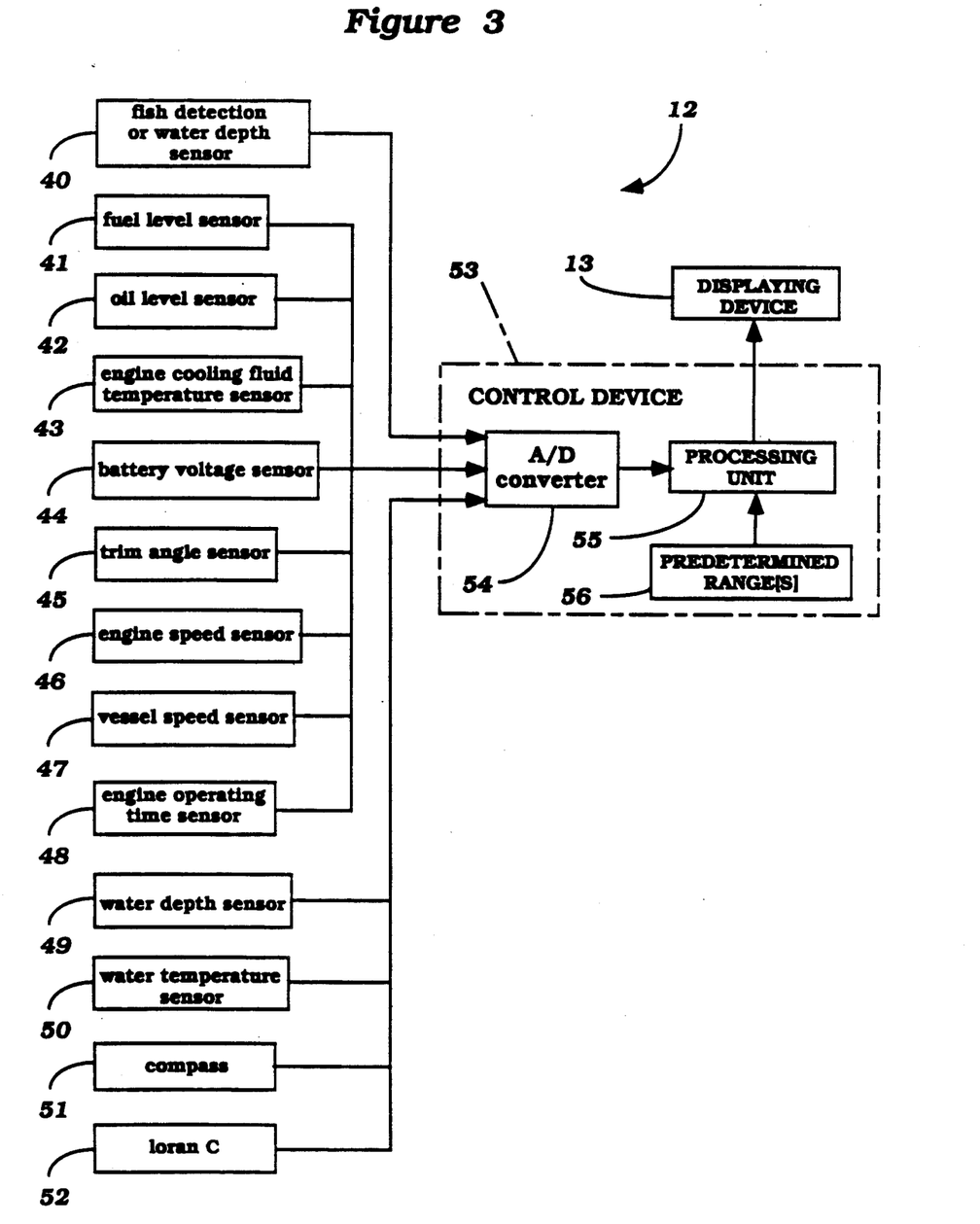
FIG. 3 is a block diagram showing an arrangement of the display system.

Referring now to FIG. 3, the display system 12 further includes a control device 53. This control device 53 includes an analog/digital (A/D) converter 54, a Processing unit 55 and a predetermined range or ranges for one or more of the various operating and navigating conditions 56. In operation, the various means for detecting various operating and navigating conditions of the display system 12 such as the fish detection sensor 40, fuel level sensor 41, oil level sensor 42, engine cooling fluid temperature sensor 43, battery voltage sensor 44, trim angle sensor 45, engine speed sensor 46, vessel speed sensor 47, engine operating time sensor 48, water depth sensor 49 and water temperature sensor 50, compass 51 and long range navigational system (loran C) 52 input their signals to the control device 53. The processing unit 55 receives the outputs of the various sensors including the compass and loran C 40-52 through the A/D converter 54 and displays the sensor outputs as information on the displaying device 13. The processing unit 55 also receives outputs from the predetermined range or ranges for one or more of the various operating and navigating conditions 56. When a particular condition is detected to be outside of its predetermined range 56 stored in the control device 53, the processing unit 55 automatically displays on the variable display 15 of the displaying device 13 warning information regarding that particular condition.

Figure 4:
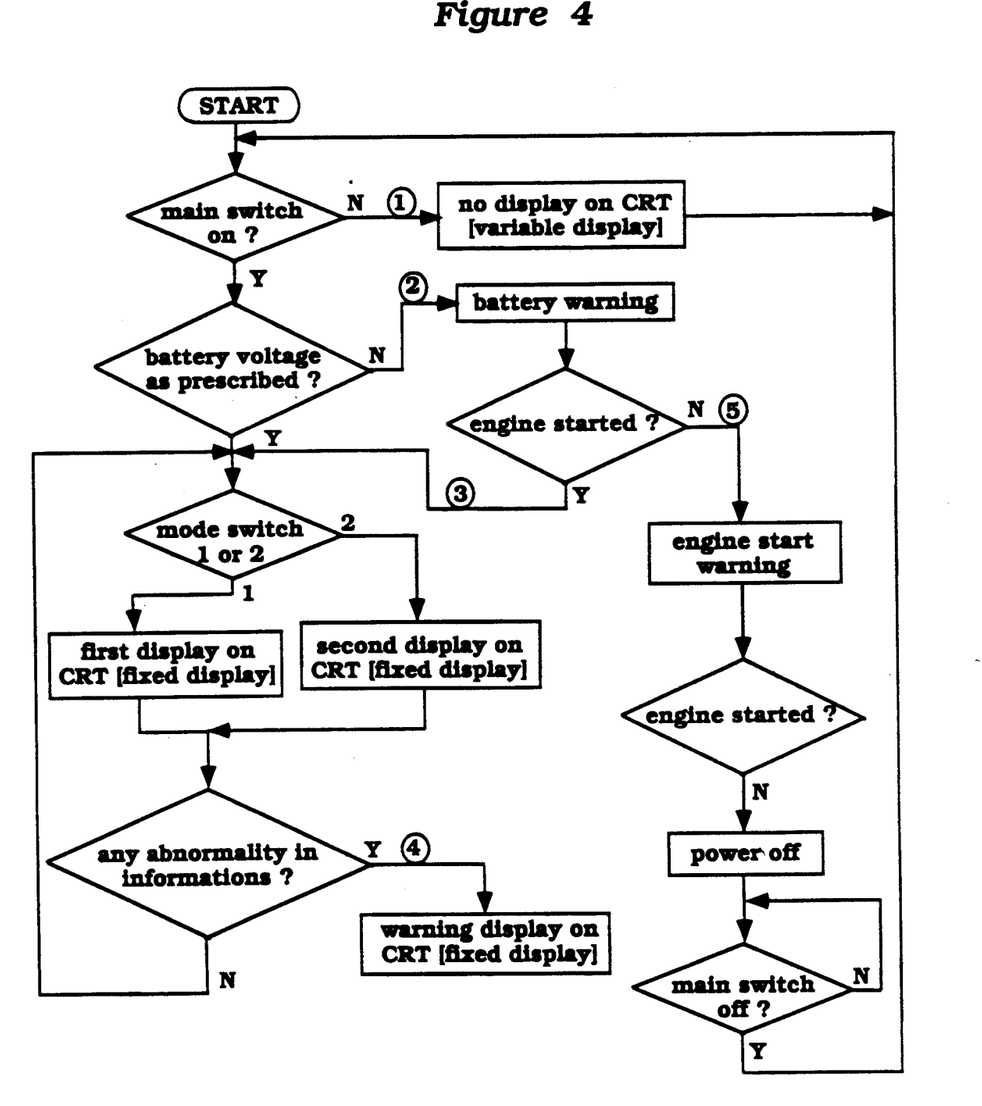
FIG. 4 is a flow chart showing an embodiment of the operation of the display system.

FIG. 4 shows an embodiment of the operation of the variable display 15 of the display system 12. If the main switch used to turn on the variable display 15 is off, there will be no display on the variable display 15 and the program repeats. If the main switch is on, the variable display 15 will appear on the displaying device 13. At that point, a determination is made as to whether the battery voltage 27 is as prescribed. If the battery voltage 27 is outside of its predetermined range 56, the battery voltage warning 27A appears on the variable display 15. The next juncture is controlled by whether or not the engine is started. If the engine is started, the operator may use the mode switch 39 for displaying either the first or second displays 16 or 17 of the variable display 15. By depressing the mode switch 39, the operator can change from the first display 16 to the second display 17 or vice versa. However, the operator's ability to change between the first and second displays 16 and 17 is subject to whether there is any abnormality in information regarding at least one of the various operating and navigating conditions of the vessel. If a particular condition is detected to be outside of its Predetermined range, warning information regarding that condition is automatically flashingly displayed on the variable display 15. This warning information is part of the warning display 18 and may be accompanied by a warning buzzer.

If no abnormalities are detected, the operator may continue to alternately display the first and second displays 16 and 17 by using the mode switch 39.

Referring back to the juncture controlled by whether the engine is started after the battery voltage warning 27A appears on the variable display 15, if the engine is not started, an engine start warning lights up on the dashboard of the marine vessel 11. If the engine remains unstarted at that point, the power is turned off. When the main switch is turned off the program repeats.

If the engine is started following the battery voltage warning 27A, the program enters the junction where the operator may use the mode switch 39 to alternately display either the first or second displays 16 or 17. The program enters that same junction if the engine is started after the engine start warning appears.

Figure 5:
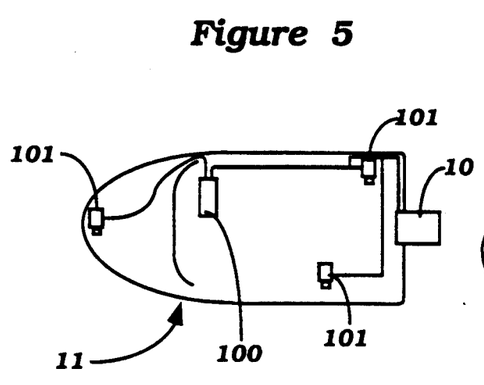
FIG. 5 is a schematic illustration showing an embodiment of the display system including sub-displays and an example of installation.

FIG. 5 illustrates an example of installation of the display system 12. In this embodiment, the main display 100 which includes the control device 53, is positioned in front of the driver's seat for viewing by the vessel driver. Sub-displays 101 which includes the displaying device 13 but do not include the control device 53 are positioned in other locations in the marine vessel 11 to permit viewing of the displayed information in those locations as well. FIG. 5 shows three (3) sub-displays. One is positioned at the bow end of the marine vessel 11, another is positioned at the stern end of the vessel 11 on the starboard side, and the third is positioned on the port side of the vessel 11. In this embodiment, information displayed on the displaying device 13 can be viewed at four (4) different locations within the marine vessel 11 for convenience of the operator and other individuals who may be aboard the vessel 11. The various detecting means or sensors input their signals to the control device 53 of the main display 100. The control device 53 displays the sensor outputs as information on the main display 100 and on the sub-displays 101.

Figure 6:
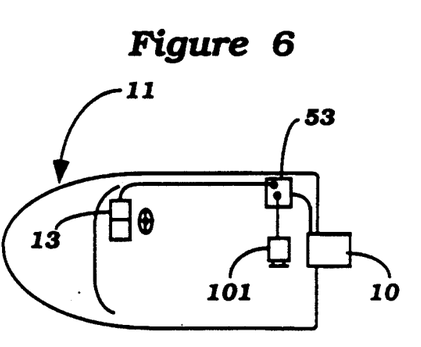

FIG. 6 shows another example of installation of the display system 12. In this embodiment, the displaying device 13 is positioned on the dashboard of the marine vessel 11 in front of the driver's seat while the control device 53 is located at the stern end of the vessel 11 on the starboard side. A sub-display 101 is positioned at the stern end of the vessel 11 in front of the outboard drive unit 10.

In this arrangement, the control device 53 receives the sensor outputs and displays them as information on both the displaying device 13 and the sub-display 101.

Figure 7:
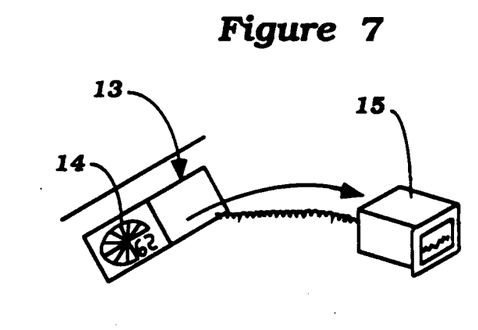
FIG. 7 is a schematic representation showing a modification of the display system.

FIG. 7 schematically illustrates a modification of the display system 12. In this embodiment, the variable display 15 can be located adjacent to the fixed display 14 or in a different position within the marine vessel 11 or vehicle.

Figure 8:
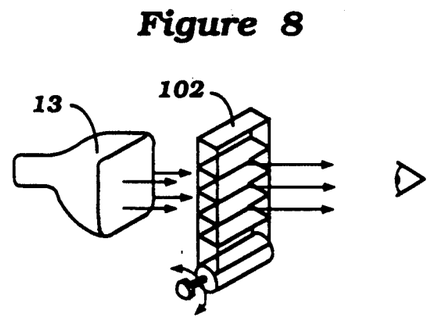
FIG. 8 is a schematic representation showing another modification of the display system.

FIG. 8 schematically illustrates another modification of the display system 12. A screen 102 is positioned in front of, or on, the displaying device 13 for easier viewing in sunny conditions. The screen 102 includes a manually operated knob for opening and closing the screen 102.

Figure 9:
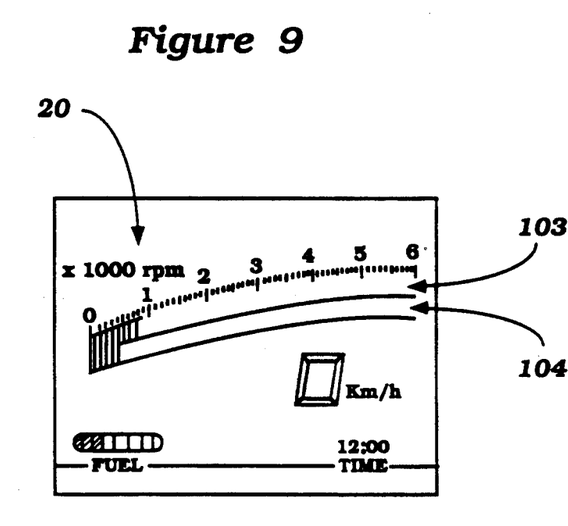
FIG. 9, is a schematic illustration of another embodiment of the invention in conjunction with a twin-engine vessel, wherein the displaying device graphically displays the engine speed of each individually.

FIG. 9 shows an example of how information concerning engine speed 20 is displayed for a marine vessel 11 having twin-engines. In this embodiment, the displaying device 13 graphically displays the engine speed 20 of each engine individually. The engine speed of the first engine is indicated by reference numeral 103 and the engine speed of the second engine indicated by numeral 104.

Figure 10:
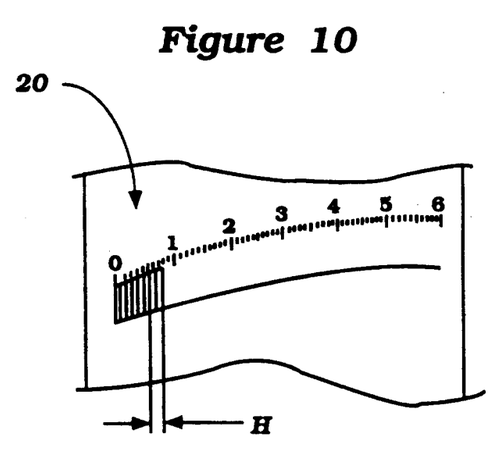
FIG. 10 is a schematic illustration of yet another embodiment of the invention in conjunction with a twin-engine vessel, wherein the displaying device graphically displays the engine speed of both engines on a single graph.

FIG. 10 shows another example of how information concerning engine speed 20 is displayed for a marine vessel 11 having twin-engines. Here, the displaying device 13 graphically displays the engine speed of both engines on a single graph. In this embodiment, the difference between the engine speeds is given by the letter H.

Although several embodiments of the invention have been illustrated and described, various changes and modifications may be made without departing from the spirit and scope of the invention, as defined by the appended claims.

I claim:

1. In a marine vessel having an outboard drive unit including propelling means for propelling said vessel through the water, the improvement comprising a display system, including various means for detecting various operating and navigating conditions of said vessel, means for detecting fish, and a single displaying device comprised of a variable display having first and second alternate displays of information each for displaying information regarding at least one of the detected various operating and navigating conditions, said variable display further having a warning display which automatically displays warning information regarding at least one of said various operating and navigating conditions when that particular condition is detected to be outside of a predetermined range for that particular condition regardless of which of said alternate displays is being displayed.

2. In a marine vessel as recited in claim 1, wherein one of said alternate displays of information of said single displaying device displays information regarding the detection of fish.

3. In a marine vessel as recited in claim 2, wherein said single displaying device comprises a fixed display for displaying information regarding particular operating and navigating conditions.

4. In a marine vessel as recited in claim 3, wherein said display system further comprises a mode switch for alternately displaying the first and second displays of said variable display.

5. In a marine vessel as recited in claim 4, wherein said display system comprises a control device including an A/D converter and a processing unit which receives outputs from said various detecting means and fish detecting means through said converter and displays the outputs as information on said displaying device, said control device further including means for automatically displaying on said displaying device warning information regarding at least one of said various operating and navigating conditions when that particular condition is detected to be outside of its predetermined range.

6. In a marine vessel as recited in claim 5, wherein said fish detecting means comprises a fish detection sensor.

7. In a marine vessel as recited in claim 6, wherein said various detecting means include a fuel level sensor, an engine speed sensor, an engine cooling fluid temperature sensor, and a water depth sensor.

8. In a marine vessel as recited in claim 7, wherein said information regarding said detected conditions includes fuel level, engine speed, engine cooling fluid temperature, and water depth.

9. In a marine vessel as recited in claim 8, wherein said information regarding the detection of fish includes fish detection including the presence or absence of the fish.

10. In a marine vessel as recited in claim 9, wherein said information regarding particular operating and navigating conditions displayed on said fixed display includes fuel level and engine speed.

11. In a marine vessel as recited in claim 10, wherein said first display of information on said variable display includes engine cooling fluid temperature and water depth.

12. In a marine vessel as recited in claim 11, wherein said second display of information on said variable display includes fish detection.

13. In a marine vessel as recited in claim 12, wherein said warning display of warning information includes flashing warning information.

14. In a marine vessel as recited in claim 13, wherein said display system further comprises a warning buzzer which sounds when said warning information regarding at least one of said various operating and navigating conditions is displayed.

15. In a vehicle, the improvement comprising a display system, including various means for detecting various operating and navigating conditions of said vehicle, a single displaying device comprised of a variable display having first and second alternate displays of information each for displaying information regarding at least one of the detected various operating and navigating conditions, said variable display further having a warning display which automatically displays warning information regarding at least one of said various operating and navigating conditions when that particular condition is detected to be outside of a predetermined range for that particular condition regardless of which of said alternate displays is being displayed.

16. In a vehicle as recited in claim 15, wherein said single displaying device further comprises a fixed display.

17. In a vehicle as recited in claim 16, wherein said display system further comprises a mode switch for alternately displaying the first and second displays of said variable display.

18. In a vehicle as recited in claim 17, wherein said display system further comprises a control device for automatically displaying the warning display of said variable display when that particular condition is detected to be outside of the predetermined range for that particular condition.

19. In a vehicle as recited in claim 18, wherein said warning information includes flashing warning information.

* * * * *